United States Patent
Evanovich et al.

(10) Patent No.: US 9,782,693 B2
(45) Date of Patent: Oct. 10, 2017

(54) METHOD OF DEWATERING HYDRAULIC, LUBRICATING AND PETROLEUM BASED FLUIDS USING A POSITIVE PRESSURE DRYING GAS IN A GRAVITY OPERATED, MOBILE, DEWATERING SYSTEM

(71) Applicants: Steven R. Evanovich, Pittsburgh, PA (US); Martin Bauer, Lebach (DE); Andreas Schunk, Waldmohr (DE); John Kazimierz Duchowski, Saarbrücken (DE)

(72) Inventors: Steven R. Evanovich, Pittsburgh, PA (US); Martin Bauer, Lebach (DE); Andreas Schunk, Waldmohr (DE); John Kazimierz Duchowski, Saarbrücken (DE)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 958 days.

(21) Appl. No.: 13/948,466

(22) Filed: Jul. 23, 2013

(65) Prior Publication Data
US 2014/0158643 A1    Jun. 12, 2014

Related U.S. Application Data

(60) Division of application No. 13/081,947, filed on Apr. 7, 2011, now Pat. No. 8,491,785, which is a (Continued)

(51) Int. Cl.
*B01D 17/02* (2006.01)
*B01D 1/14* (2006.01)
(Continued)

(52) U.S. Cl.
CPC ........... *B01D 17/0214* (2013.01); *B01D 1/14* (2013.01); *C10G 33/00* (2013.01); *C10G 33/06* (2013.01);
(Continued)

(58) Field of Classification Search
None
See application file for complete search history.

(56) References Cited

U.S. PATENT DOCUMENTS 3,448,038 A * 6/1969 Pall ........................ C10G 33/06
                                                            208/187
4,738,695 A    4/1988 Carr et al.
(Continued)

FOREIGN PATENT DOCUMENTS

GB    2323048        9/1998
GB    2466698 A  *  7/2010  ........... B01D 17/045
(Continued)

OTHER PUBLICATIONS

C.C.Jensen A/S, Desorber D10, http://www.cjc.dk/fileadmin/user_upload/pdf/CJC_Products_PS/DesorberD10_PSST1020UK.pdf, Apr. 10, 2008.
(Continued)

*Primary Examiner* — Terry Cecil
(74) *Attorney, Agent, or Firm* — Blynn L. Shideler; Krisanne Shideler; BLK Law Group

(57) ABSTRACT

A high throughput, positive pressure, gravity operated dewatering system for hydraulic fluids, lubricating fluids, and petroleum based fluids comprises a gravity operated dewatering chamber receiving the industrial fluid and a source of positive pressure drying air coupled to the dewatering chamber.

17 Claims, 6 Drawing Sheets

Related U.S. Application Data continuation of application No. PCT/US2009/059902, filed on Oct. 7, 2009.

(60) Provisional application No. 61/103,325, filed on Oct. 7, 2008.

(51) Int. Cl.
*C10G 33/00* (2006.01)
*C10G 33/06* (2006.01)
*C10M 175/00* (2006.01)
*F01M 13/04* (2006.01)

(52) U.S. Cl.
CPC ............... *C10M 175/0058* (2013.01); *F01M 2013/0477* (2013.01)

(56) References Cited

U.S. PATENT DOCUMENTS

| | | |
|---|---|---|
| 5,211,856 A | 5/1993 | Shen |
| 5,225,073 A | 7/1993 | Billet et al. |
| 6,042,722 A | 3/2000 | Lenz |
| 7,993,530 B2 | 8/2011 | Horne |
| 2003/0164342 A1 | 9/2003 | Mason |
| 2003/0234455 A1 | 12/2003 | Mieney et al. |
| 2005/0173337 A1 | 8/2005 | Costinel |
| 2006/0231462 A1 | 10/2006 | Johnson |

FOREIGN PATENT DOCUMENTS

| | | |
|---|---|---|
| JP | 11137908 A | 5/1999 |
| JP | 2006-198604 | 8/2006 |

OTHER PUBLICATIONS

C.C.Jensen A/S, Desorber D30, http://www.cjc.dk/fileadmin/user_upload/pdf/CJC_Products_PS/DesorberD30_PSST1021UK.pdf, Apr. 10, 2008.

C.C.Jensen A/S, Desorber D40, http://www.cjc.dk/fileadmin/user_upload/pdf/CJC_Products_PS/DesorberD40_PSST1022UK.pdf, Apr. 23, 2009.

C.C.Jensen A/S, Desorber D88, http://www.cjc.dk/fileadmin/user_upload/pdf/CJC_Products_PS/DesorberD88_PSST1023UK.pdf, May 6, 2009.

C.C.Jensen A/S, Blue Baleen Oil Absorb 38/50, http://www.cjc.dk/fileadmin/user_upload/pdf/CJC_Products_PS/BBOilAbsorb3850_PSST1302UK.pdf, May 26, 2010.

C.C.Jensen A/S, Blue Baleen Oil Absorb 38/100, http://www.cjc.dk/fileadmin/user_upload/pdf/CJC_Products_PS/BBOilAbsorb38100_PSST1302UK.pdf, May 26, 2010.

C.C.Jensen A/S, Blue Baleen Oil Absorb 38/100 Multistay, http://www.cjc.dk/fileadmin/user_upload/pdf/CJC_Products_PS/BBOilAbsorbMultiStay_PSST1302UK.pdf, May 26, 2010.

\* cited by examiner

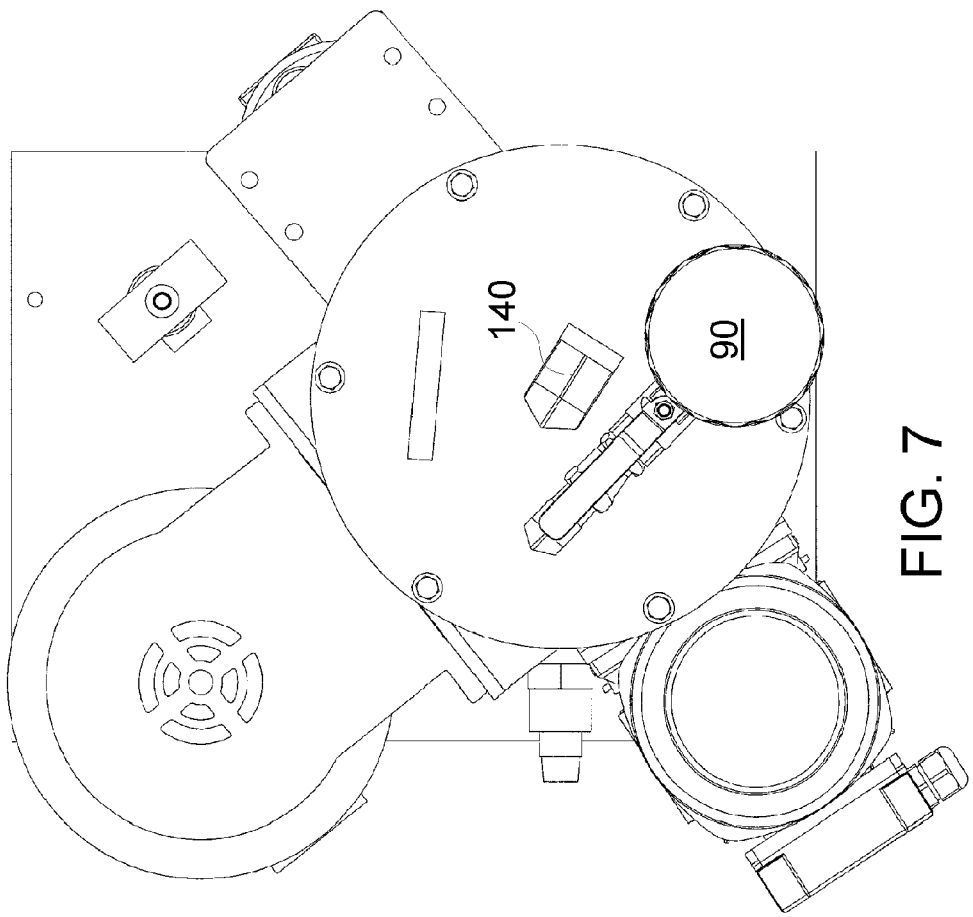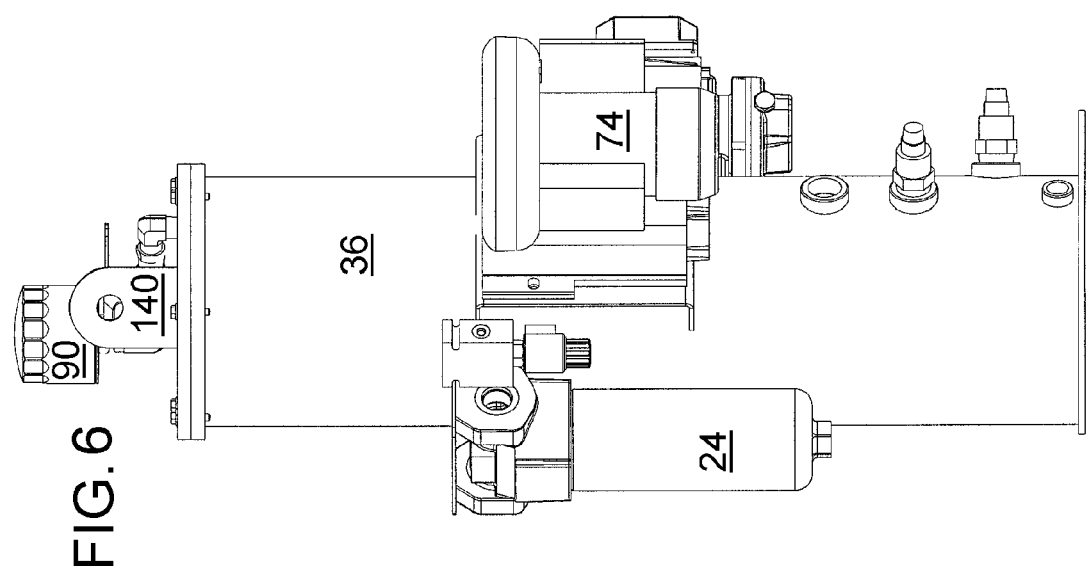

METHOD OF DEWATERING HYDRAULIC, LUBRICATING AND PETROLEUM BASED FLUIDS USING A POSITIVE PRESSURE DRYING GAS IN A GRAVITY OPERATED, MOBILE, DEWATERING SYSTEM

CROSS-REFERENCE TO RELATED APPLICATION

This application is a divisional of U.S. patent application Ser. No. 13/081,947 entitled "Positive Pressure, Conditioned Drying Gas, Gravity Operated, Mobile, Dewatering System for Hydraulic, Lubricating and Petroleum Based Fluids," and filed Apr. 7, 2011, published Apr. 5, 2012 as U.S. Patent Application Publication No. 2012-0080363, which publication is incorporated herein by reference, and issued Jul. 23, 2013 as U.S. Pat. No. 8,491,785, which is incorporated herein by reference. U.S. patent application Ser. No. 13/081, 947 is a continuation of International Patent Application PCT/US09/59902 entitled "Positive Pressure, Conditioned Drying Gas, Gravity Operated, Mobile, Dewatering System for Hydraulic, Lubricating and Petroleum Based Fluids," filed Oct. 7, 2009 and published Apr. 15, 2010 as WO/2010/042663 which is incorporated herein by reference. International Patent Application PCT/US09/59902 claims the benefit of U.S. Provisional Patent Application Ser. No. 61/103, 325, entitled "Positive Pressure, Conditioned Drying Gas, Gravity Operated, Mobile, Dewatering System for Hydraulic, Lubricating and Petroleum Based Fluids", filed on Oct.7, 2008.

BACKGROUND OF THE INVENTION

1. Field of the Invention

The present invention relates generally to a portable dewatering system, more specifically to a positive pressure, conditioned drying gas, gravity operated, dewatering system for hydraulic fluids, lubricating fluids, and petroleum based fluids like diesel fuel and the like.

2. Description of Related Art

Many lubricating fluids, petroleum based fluids such as hydraulic fluid, lubricating fluids, diesel fuel, bio-diesel fuel and the like, may need to be dewatered (remove or decrease the water content) to improve the relative performance or efficiency of the fluid and to reduce component damage. Petroleum based, also called hydrocarbon based, hydraulic fluids are the most common fluids for hydraulic systems. The difference between petroleum based hydraulic fluid and straight oil is generally the additives in the operating fluid. Hydraulic fluid also includes phosphate esters, which are somewhat fire resistant and generally allow for higher operating temperatures while providing lubrication qualities equal to petroleum based hydraulic fluids. Hydraulic fluid also includes synthetics fluids and synthetic blends that are usually phosphate esters, chlorinated hydrocarbons or a blend.

In hydraulic systems excess free or dissolved water can cause damage to sensitive or precision tolerance components. Under high pressure that is typical in hydraulic systems, water under compression can turn to steam causing cavitations damage, improper performance and degradation of the operating fluid.

For example, it is essential that the fuel used in fuel injected internal combustion engines and jet engines be free of water, algae, and other contaminates. When fuel is stored in bulk, such as in vehicle, boat, and aircraft fuel tanks, water droplets condensed from the atmosphere will form inside the fuel storage tanks and their ventilation pipes. The accumulation of this condensation, and possible microbial growth, will eventually be ingested by the engine fuel pick-up tubes, and carried along with the fuel to the engine fuel filtration system. In the case of ships at sea and aircraft as they encounter turbulent and rough conditions, the accumulated condensation at the fuel water interface moves about the storage tank so as to be easily ingested in quantities large enough to totally fill or saturate the engines filtration system causing the engine to stop.

In order to address these needs there have been developed a number of dewatering systems. The dewatering systems commercially available, and those only proposed in the literature, can fall into several broad classes. The present invention is only directed to the dewatering of hydraulic fluid, lubricating fluids, petroleum based fluids and the like. In these areas the dewatering systems can also be referred to as dehydrating systems and these terms can be used interchangeably throughout. Each of these terms, individually, however, are also commonly used in some water removal systems for very far removed applications from the present field. For example "dewatering systems" also reference sludge dewatering systems in waste water purification systems (i.e. sewage treatment); and "dehydration systems" also reference a class of food processing equipment.

As noted above the present invention is directed to the dewatering of "industrial fluids" such as hydraulic fluid, lubricating fluids, petroleum based fluids and the like. Within the meaning of this application the phrase "Industrial Fluid" includes petroleum based fluids, phosphate ester based fluids, and synthetics wherein water is removed or reduced from the fluid leaving the industrial fluid behind.

One class of industrial fluid dewatering system is an industrial fluid centrifugal separation system that can be used to separate out the water from the subject industrial fluid and the water drawn off. This requires a centrifuge for operation which limits the throughput and there is a question of how this operation affects the efficiency of the subject industrial fluid following the separation process. Representative examples of this technology can be found manufactured by Auxill Nederland BV which supplies devices using several centrifugal techniques, each with their specific utilization.

A second class of industrial fluid dewatering systems is based upon gravity separation of fluids, such as described in U.S. Pat. No. 6,042,722. This patent, which is included herein by reference in its entirety, discloses an apparatus for separating water contaminants from a fuel which has a specific gravity which is lower than that of water. The patent discloses that contaminated fuel is drawn from a bottom of a tank and passed into a separator, wherein the water stays at the bottom of the separator and is drained off. The patent notes that the fuel is forced upwardly from which any droplets of water flow along collector plates and fall to the bottom of the separator. The patent then notes that the fuel is passed through a filter which removes any particles of matter then the fuel is directed back to the tanks. The patent notes that the process can be repeated for as many times as necessary to cleanse the fuel of water and contaminates.

Industrial fluid dewatering systems can utilize coalescing technology to separate two mixed fluids. In a system using coalescing technology a porous barrier is presented that presents a greater flow resistance to one fluid, generally the contaminant, than it does the other. The fluid that experiences the greatest resistance will slow down or even stop and as this occurs smaller droplets come together forming larger ones. These eventually collect in globules large enough to settle or to form a surface layer. The agglomeration of smaller droplets to form larger ones is the definition of coalescence.

The "gravity based" industrial fluid dewatering systems in which the specific gravity difference between water and the industrial fluid being treated is used to run the system are distinguished from gravity "operated" industrial fluid dewatering systems in which gravity is used to move the industrial fluid to be cleaned through a cleaning chamber or process. The present invention, and most vacuum based systems, are gravity operated within the meaning of the present application, but are not "gravity based"

A further class of industrial fluid dewatering systems is filtration systems using water absorbing filters, but large scale water removal utilizing water absorbing filters is inefficient as these types of filters can only remove free water and some loosely emulsified water from industrial fluids. Water absorbent filters remove free and some emulsified water by super absorbent polymers impregnated in the media of the filter cartridge. The water is absorbed by the polymer, causing it to swell, and remains trapped in the filtration medium. Super absorbent filters can remove only a limited volume of water before causing the filter to go into pressure drop induced bypass. They are not well-suited for removing large volumes of water, but are a convenient method to maintain dry conditions in industrial systems that don't normally ingest a lot of water. These filters do not remove dissolved water from the industrial fluid.

Vacuum dewatering systems, also called vacuum dehydrators, is another class of industrial fluid dewatering system and can be classified as a mass transfer based industrial fluid dewatering system. Vacuum dehydrators have the advantage of being able to separate free, emulsified and dissolved water. See for example the industry leading industrial fluid vacuum dewatering or vacuum dehydrating systems manufactured by Schroeder Industries LLC under the SVD brand name. The SVD brand unit, when connected to a hydraulic reservoir of a system with wet industrial fluid, will draw the industrial fluid into a chamber where the fluid cascades down in a reactor chamber. Water is separated in the form of vapor and is removed by the vacuum pump. The vapor can be released to the atmosphere or condensed in a separate reservoir. The dewatered industrial fluid is pumped from the reactor chamber back to the system reservoir at a continuous flow rate. Further details of this system and technology can be found using the keyword "SVD" at the website www.schroederindustries.com.

Another class of industrial fluid dewatering systems is a high vacuum/heat purifiers flash distillation process which utilizes higher vacuum and temperature conditions inside a chamber, as compared to the vacuum dehydrators, to rapidly boil off water and other volatile materials from the industrial fluid. Flash distillation type equipment is often operated at vacuum and temperature conditions that are well within the vapor phase region of the industrial fluid for faster removal of water. The vacuum and temperature levels are more severe, wherein vacuum levels of >26 "Hg and temperatures >160° F. are commonly used in these equipment. Vapor condensers are often used to remove the vapors before they get to the vacuum pump. By virtue of higher vacuum and temperature levels, these units can offer higher water removal efficiencies for each pass of the industrial fluid compared with that of the mass transfer—vacuum dehydration type purifiers, but they also expose the fluid to higher thermal stresses in the process. Further, these systems require the creation and maintaining of high vacuum conditions.

The described uses of the above identified industrial fluid dewatering systems can represent challenging operational environments for such systems. For example, onboard ships, space is typically at a premium and the industrial fluid dewatering system must accommodate this restricted environment. Further, in such environments, mobile or portable units are often employed at periodic intervals, rather than permanent on board units. The portable applications require a portable system to fit through restricted access hatches, which can be on the order of 600 mm (about 24").

As a representative example, consider a submarine application (a submarine is a type of ship within the meaning of this application) which will typically have 600 mm hatches and minimal equipment loading capabilities in many passageways (e.g. only a hand operated winch may be available for assisting in the raising and lowering of equipment through a hatch between levels). Further, some ship operating protocols require such portable equipment to be capable of being manually loaded and unloaded, which will further restrict the weight of the associated system. These size and weight restrictions make many of the prior art industrial fluid dewatering systems impractical and will severely limit the throughput of industrial fluid dewatering systems of the prior art that are sized to accommodate these operational restrictions. A low throughput industrial fluid dewatering system can quickly become impractical for many applications.

Within the meaning of this application, the terms portable and mobile are interchangeable and reference a system that is designed to be transported or moved into operating position. Within the meaning of this application, the phrase "hatch accessible" references a system that is designed to be transported or moved, in whole or in part, through a 600 mm hatch opening. Within the meaning of this application, the phrase "manually loadable" references a system that is designed such that each loadable component of the system is less than about 115 kgs (about 250 lbs).

The phrase "high through put" is a relative description when referencing a system that is designed to operate by processing at a given liters/hour rate of industrial fluid. Similarly, a "low" through put system is a relative description that references a system that is designed to operate or process less liters/hour of industrial fluid than a high throughput system of similar size. All of the systems are generally scalable unless there are operating restrictions, such as hatch accessibility or other space concerns, whereby the system is sized to provide the desired throughput, based upon its own system operating parameters.

There is a need in the art for cost effective dewatering systems, such as for a portable, hatch accessible, manually loadable, high throughput industrial fluid dewatering system that maintains the advantages of non-portable, non-hatch accessible, non-manually loadable vacuum dehydration industrial fluid dewatering systems of the prior art.

SUMMARY OF THE INVENTION

The inventors of the present invention provides a industrial fluid dewatering system comprising a gravity operated dewatering chamber receiving the industrial fluid and a source of positive pressure drying air coupled to the dewatering chamber.

The industrial fluid dewatering system may further include an industrial fluid pump coupled to a common line and configured to operate to pull industrial fluid into, and out of the system, and may further include a post pump directional valve at a terminal end of the common line, and a chamber input line extending from the directional valve to a distribution manifold within the gravity operated dewatering chamber, wherein the distribution manifold is configured to relatively evenly distribute the industrial fluid across, or about, the top of the chamber. The industrial fluid dewatering system may further include a chamber outlet line extending from the chamber and terminating at a pre-pump directional valve, wherein the outlet line operates to transmit industrial fluid from the chamber to the common line through the pre-pump valve and the pump. The industrial fluid dewatering system for a subject industrial fluid according to the invention may be configured to toggle between introducing industrial fluid to be processed into the system and passing dewatered industrial fluid out of the system.

The industrial fluid dewatering system may further include reticulated media resting on a perforated plate within the chamber, wherein the reticulated media forms a tortuous path for the gravity driven industrial fluid to flow down while it is being acted upon by positive pressure drying air within the chamber. The industrial fluid dewatering system may further include baffle plates below the perforated plate and above a settling tank portion of the chamber. The industrial fluid dewatering system may further include low and high level sensors provided in the settling tank portion of the chamber to provide indication of the level of industrial fluid within the settling tank portion.

The industrial fluid dewatering system for a subject industrial fluid may further include a mechanism for increasing the temperature of the gas above ambient air temperatures, such as a regenerative blower coupled to ambient air. The industrial fluid dewatering system for a subject industrial fluid may further include a drying gas distribution manifold configured to evenly distribute the drying gas across the chamber, and a demisting foam within the chamber and configured to assist in condensate forming thereon being returned down through the chamber via gravity.

The industrial fluid dewatering system for a subject industrial fluid may further include a drying gas outlet line coupled to the chamber to vent the drying gas to atmosphere, and including an orifice or adjustable flow outlet within the drying gas outlet line configured to increase the pressure within the chamber or to control the flow rate through and pressure in the chamber.

The industrial fluid dewatering system for a subject industrial fluid may further include cyclically operating de-aerating components coupled to the chamber. The cyclically operating de-aerating components may include a vacuum pump, wherein the vacuum pump is configured for use when there is no flow of drying gas into the chamber. The cyclically operating de-aerating components may include a venturi vacuum element for selectively inducing a vacuum within the chamber.

The industrial fluid dewatering system for a subject industrial fluid according to the invention may includes a lift point on the chamber and wheels supporting the system to form a portable, hatch accessible, manually loadable, high throughput industrial fluid dewatering system.

These and other advantages of the present invention will be clarified in the detailed description of the preferred embodiments taken together with the attached figures wherein like reference numerals reference like elements throughout.

BRIEF DESCRIPTION OF THE DRAWINGS

FIG. 6 a front elevation view of a portable, hatch accessible, manually loadable, high throughput industrial fluid dewatering system according to one aspect of the present invention; and FIG. 7 is a top plan view of the portable, hatch accessible, manually loadable, high throughput industrial fluid dewatering system of FIG. 6.

DETAILED DESCRIPTION OF THE INVENTION

It is noted that, as used in this specification and the appended claims, the singular forms "a," "an," and "the" include plural referents unless expressly and unequivocally limited to one referent. The various embodiments and examples of the present invention as presented herein are each understood to be non-limiting with respect to the scope of the invention.

Figure 1:
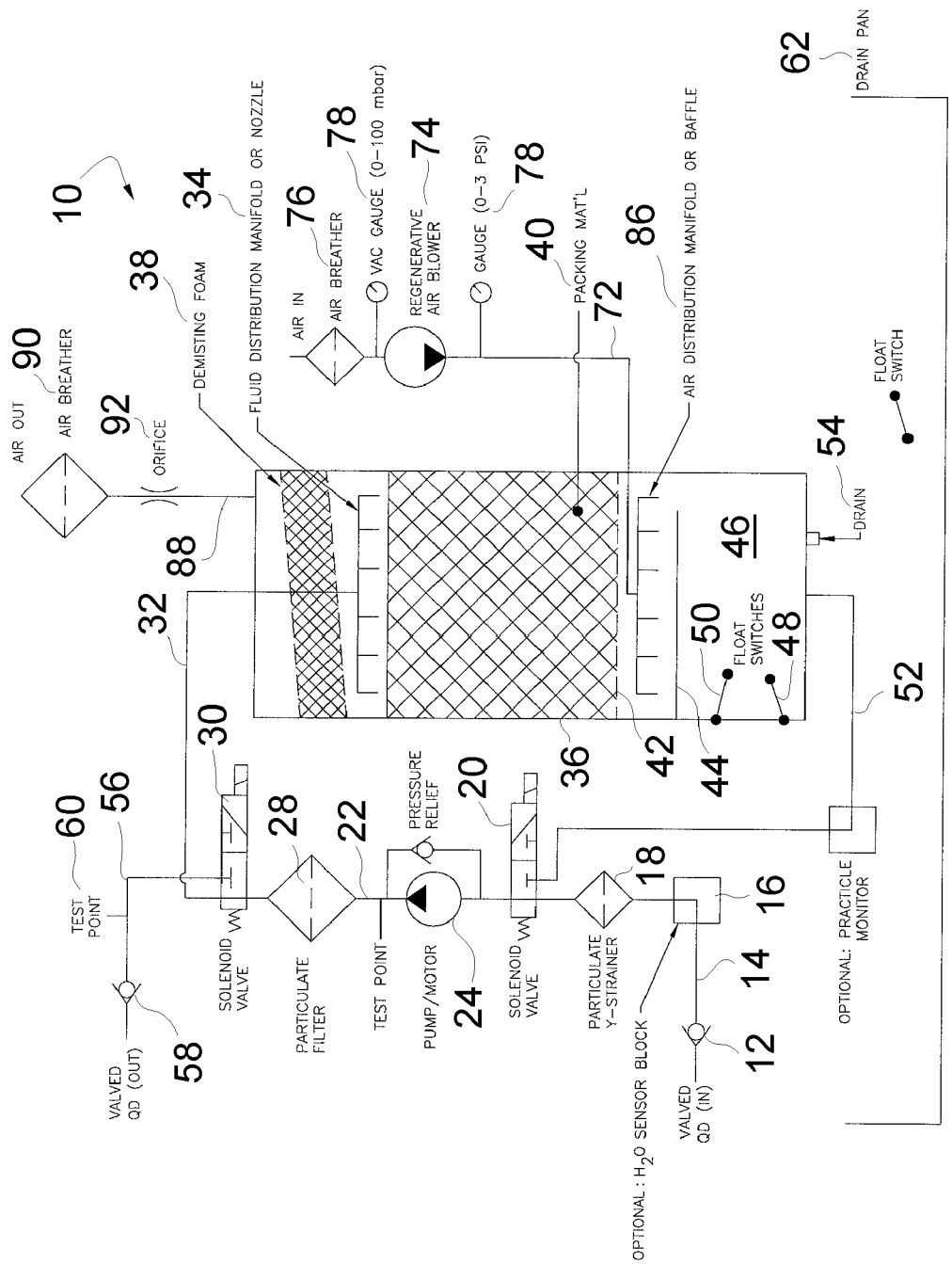
FIG. 1 is a schematic operational diagram of a industrial fluid dewatering system in accordance with one aspect of the present invention.

FIG. 1 is a schematic diagram of a portable, hatch accessible, manually loadable, high throughput industrial fluid dewatering system 10 in accordance with one aspect of the present invention. The system 10 includes a one way input check valve coupling 12 at the beginning of input line 14 for coupling the system 10 to the tank or system holding the industrial fluid to be cleaned to allow for the industrial fluid to be cleaned to flow into the system 10.

A water sensing unit or sensor block 16 can be provided in the input line 14 to measure the moisture content of the water of the industrial fluid entering the system 10. A strainer 18 is provided in the input line 14 to strain or filter the incoming industrial fluid. The input line 14 terminates in directional valve 20 which may be a solenoid operated valve operated through a control unit of the system 10.

Extending from the directional valve 20 is a common line 22. The common line 22 differs from the input line 14 in that common line 22 accommodates both industrial fluid moving into the system 10 from input line 14 and industrial fluid that has been processed by the system 10 and is returning to the industrial fluid storage tank or system.

An industrial fluid pump 24 is in the common line 22 and operates to pull industrial fluid into, and out of the system 10 as will be described. In this manner only a single industrial fluid pump 24 is used for the system 10, which greatly assists in the construction of a portable, hatch accessible, manually loadable industrial fluid dewatering system 10. Without this design, separate pumps would be required for the input and output lines, increasing the weight, size, and cost of the associated system 10.

A test point can be incorporated into the common line 22 to allow for access and testing of fluid in the common line 22. A filter or strainer 28 is provided in the common line 22 to further strain or filter the incoming/outgoing industrial fluid. The common line 22 terminates in directional valve 30 which may be a solenoid operated valve operated through a control unit of the system 10.

Extending from the directional valve 30 is a chamber input line 32. The chamber input line 32 delivers incoming industrial fluid to a distribution manifold 34 within a gravity operated dewatering chamber 36. The distribution manifold 34 can take many forms, such as two or more radial extending arms with radial spaced distribution nozzles, or a single nozzle with multiple orifices. The manifold 34 is intended to relatively evenly distribute the industrial fluid across, or about, the top of the chamber 36, at a position below an angled demisting foam layer 38.

Below the manifold 34 is reticulated media 40, also called packing material, resting on a perforated plate 42. The reticulated media 40 essentially forms a tortuous path for the gravity driven industrial fluid to flow down while it is being acted upon by the heated, positive pressure drying air as will be described below. The media 40 may be formed of, for example, individual elements that are roughly 30 mm in diameter and 25 mm long and are perforated. The articles are packed loosely and randomly in the chamber 36. The articles can be metal or plastic or any appropriate material. It may be possible for the media 40 to be used as a treating agent for the fluid, but such a system would generally require the replacement, recharging or cleaning of the media 40. For the purpose of the present application, the intended primary purpose of the media is to increase the flow path of the industrial fluid in the chamber 36.

Below the perforated plate 42 is one, or more, baffle plates 44 above a settling tank 46 portion of the chamber 36. Low and high float valves or sensors 48 and 50 are provided to provide indication of the level of industrial fluid within the settling tank 46. Foam may be located in the settling tank 46 to reduce the aeration of the industrial fluid as it cascades onto the fluid surface within settling tank 46.

A chamber outlet line 52 extends from tank 46 and terminates at directional valve 20, and operates to transmit industrial fluid from the chamber 36 to the common line 22 through the pump 24 and the valve 20. A drain 54 is provided for alternative draining of the tank 46.

An output line 56 is coupled to the direction valve 30 and is operated to transmit processed industrial fluid from the system 10. The system 10 includes a one way output check valve coupling 58 at the end of output line 54 for coupling the system 10 to the external tank or system holding the industrial fluid to allow for the dewatered industrial fluid to be returned to the external tank or system. A test point 60 can be incorporated into the output line 56 to allow for access and testing of fluid in the output line 56.

A separate receiving pan 62 can be provided below the chamber 36 and other elements of the system 10 to accommodate leaks in the system 10 as well as use of the drain 54. A sensor or float switch 64 may be provided to identify to the system 10 (and activate indicators/and or alarms) the presence of a predetermined level of fluid in the pan 62.

The sensors 48 and 50 are used by the system 10 in operation to toggle between introducing industrial fluid to be cleaned or processed into the system 10 and dewatered industrial fluid out of the system 10. Essentially with the system 10 attached to a tank or system holding industrial fluid through couplings 12 and 58 the pump 24 will begin by pulling industrial fluid into the system 10 and to the chamber 36 through input line 14, common line 22 and chamber input line 32. The system 10 will continue to operate in this manner until the level indicator 50 indicates that a high level of industrial fluid is in the tank 44. At this time the directional valves 20 and 30 will be moved whereby the operation of the pump 24 will cause processed industrial fluid to be drawn from tank 44 through chamber outlet line 52, through common line 22 through output line 56 to return to the original storage tank or system. This output operation continues until the level indicator 48 indicates a low level of fluid in tank 46, whereby valves 20 and 30 are reversed and the original filling procedure is repeated. The system 10 will continuously switch between filling and emptying of the chamber 36 based upon the level of the fluid in the settling tank 44.

The system 10 further includes a drying gas input line 72 for introducing positive pressure drying gas, such as air, into the chamber 36. A blower 74 in the input line 72 can be used to allow the system to use ambient air as a drying gas. Where ambient air is used a filter or screening unit 76 may be provided in line 72 to remove particulates and the like from the intake drying air. Pressure gauges 78 (and/or pressure regulators), and output orifices for controlling flow parameters are shown in the input line 72, but these may be considered to be part of many blower 74 unit configurations.

Additionally, heating of the drying gas has been found to improve the dewatering efficiency of the system, whereby a separate gas heating unit may be included within the input line 72. Some blowers 74 may have the heating unit incorporated therein, but the "heating unit" may be considered as a separate functional unit due to its separate function. A regenerative blower 74 will heat the air as a byproduct of the blower operation. The term heated drying gas means that the drying gas is above ambient air temperature. The system preferably uses drying gas, such as air, at a temperature range of 20-40° F. above ambient temperature.

When using ambient air that is transmitted by the blower 74, the ambient air humidity will affect the dewatering efficiency of the system 10. The drying gas heating, with blower 74 or through a separate unit, improves the dewatering ability of the ambient air by reducing its relative humidity and improving its affinity to accept moisture while passing through the chamber 36. In addition, dewatering rates increase as the flow of air, or other drying gas, increases through the chamber 36.

As noted above, one method to combine the heating of the drying gas and the operation of the blower 74 is through the use of a regenerative blower, as such blowers increases the temperature of the conveyed drying gas with increasing back pressure.

The input line 72 provides a positive pressure drying gas to chamber 36. Positive pressure within the meaning of this applications means above ambient pressure. Preferable the system 10 operates in the range only minimally above ambient.

The drying gas from the input line 72 enters the chamber 36 through a drying gas distribution manifold 86 that intended to evenly distribute the drying gas across the chamber 36. The perforated plate 42 will also serve to distribute the drying gas to some extent. The distribution manifold may take many forms as known in the manifold art and only one of which is illustrated in the schematic figures.

The heated, positive pressure drying gas introduced into the chamber 36 will interact with the industrial fluid to remove water there from, and the gas will move through the demisting foam 38. The foam 38 is at an angle to assist in condensate forming thereon being returned down through the chamber 36 via gravity. Other configurations for the angled or sloped bottom foam 38, such as a cone, dome or the like could also be used to assist in this function. Coupled to the chamber 36 above the foam 38 is a drying gas outlet line 88 which can include a used drying gas filter assembly 90 positioned before the end thereof. Line 88 can vent the drying gas to atmosphere provided that air or an equivalent is used as the drying gas. One method to increase the air pressure within the chamber 36 is to use an orifice 92 within the outlet line 88 before a final filter or breather element 90. For example, an orifice set at 0.7 PSI system pressure would increase the system drying gas temperature (air temperature) 20° F. at a 15 scfm system drying gas flow rate.

Figure 2:
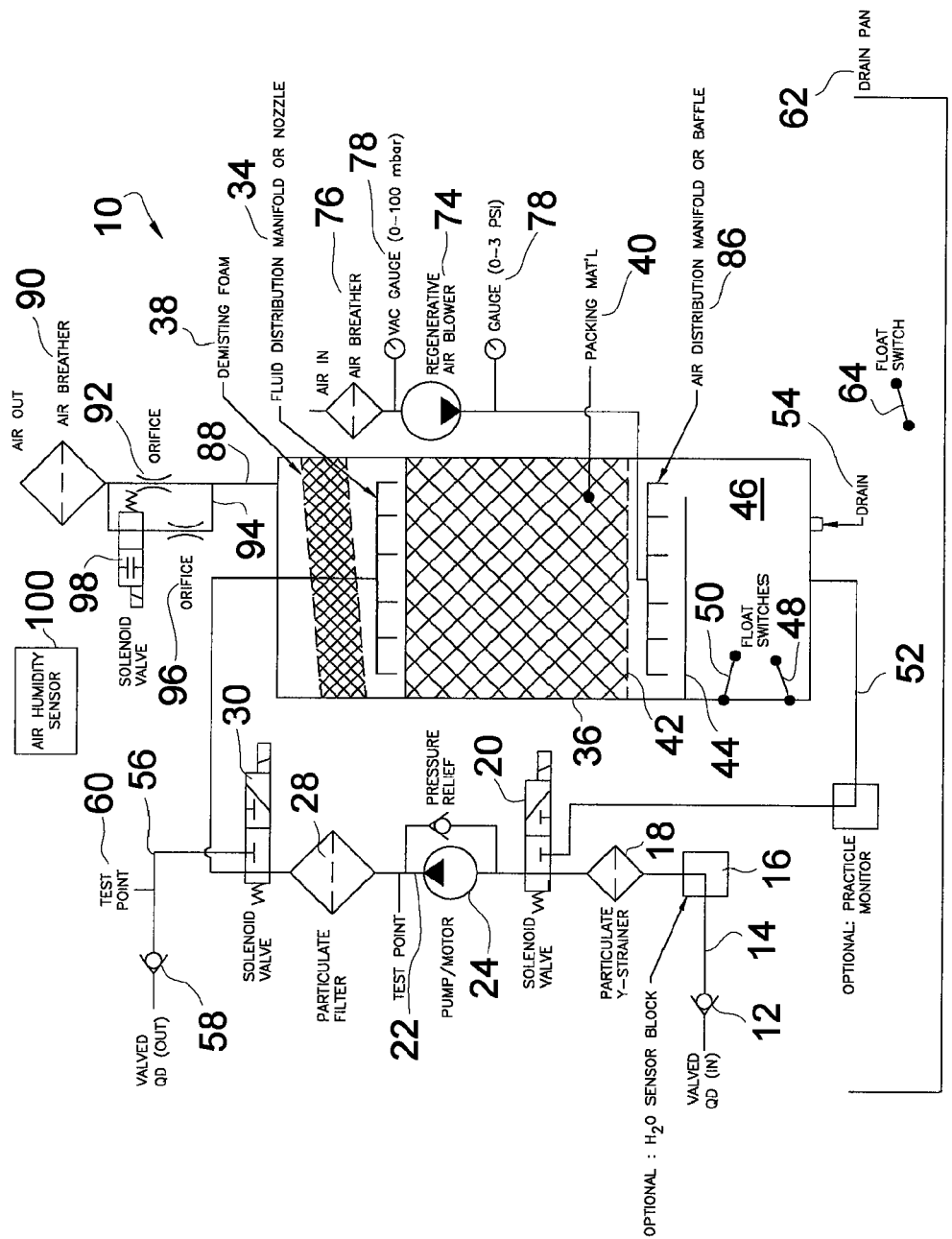
FIG. 2 is a schematic operational diagram of a industrial fluid dewatering system in accordance with another aspect of the present invention.

FIG. 2 is a schematic operational diagram of an industrial fluid dewatering system 10, similar to FIG. 1, but in accordance with another aspect of the present invention. The system 10 of FIG. 2 is substantially identical to that of FIG. 1 described above, except for construction of the drying gas outlet arrangement. The system 10 of FIG. 2 includes the outlet line 88, orifice 92 and final breather 90. The system 10 of FIG. 10 further includes a parallel line 94 extending through a second orifice 98 and blocking solenoid valve 98 to the final filter assembly 90. The system 10 of FIG. 2 further includes a air humidity sensor 100 to assist in operation of the system 10. When the ambient air is at a relatively high humidity as measured by the sensor 100 (such as for example greater than 80% relative humidity), an increase in the relative dewatering rates can be obtained by using only orifices 92 (and not orifice 96) through closing of solenoid valve 98. This operation can, for example, increase the system air pressure from 0.7 PSI to 0.9 PSI resulting in an air temperature increase from Δ 20° F. to 40° F. and a corresponding drop in air flow rate from 15 scfm to 5 scfm. At lower relative humidity as measured by the sensor 100 (such as for example lower than 80% relative humidity), effective dewatering rates can be obtained by using both orifices 92 and 96 through opening of solenoid valve 98 and having a higher flow rate of drying gas. The system 10 of FIG. 2 is intended to offer efficient dewatering using ambient air through a wide range of humidity conditions, even up to 90% humidity.

The broad concept of FIG. 2 is intended to use a "collective" variable orifice opening for the system 10 that is varied dependent on conditions. The system 10, as shown, uses two operational states (i.e. orifice 92 alone or orifices 92 and 96 used together). The addition of a closing valve associated with orifice 92 would offer a total of three operational states (orifice 92 alone, orifice 96 alone and orifices 92 and 96 together) The system 10 could be further modified to have three parallel orifices that would offer seven distinct operating positions (e.g. orifice 1, orifice 2, orifice 3, orifices 1 and 2 together, orifices 1 and 3 together, orifices 2 and 3 together, and orifices 1, 2 and 3 together). Finally the combination of a variable valve and opening to create, effectively, an infinitely variable opening could offer an infinite variety of orifice opening conditions that could be selected based upon humidity. The system illustrated in FIG. 2 is however particularly simple and likely to be successful over a wide humidity range, consequently the simplicity of this system may be preferable to the more complex systems that may better optimize the back pressure and the associated temperature gain to the sensed humidity conditions.

Figure 3:
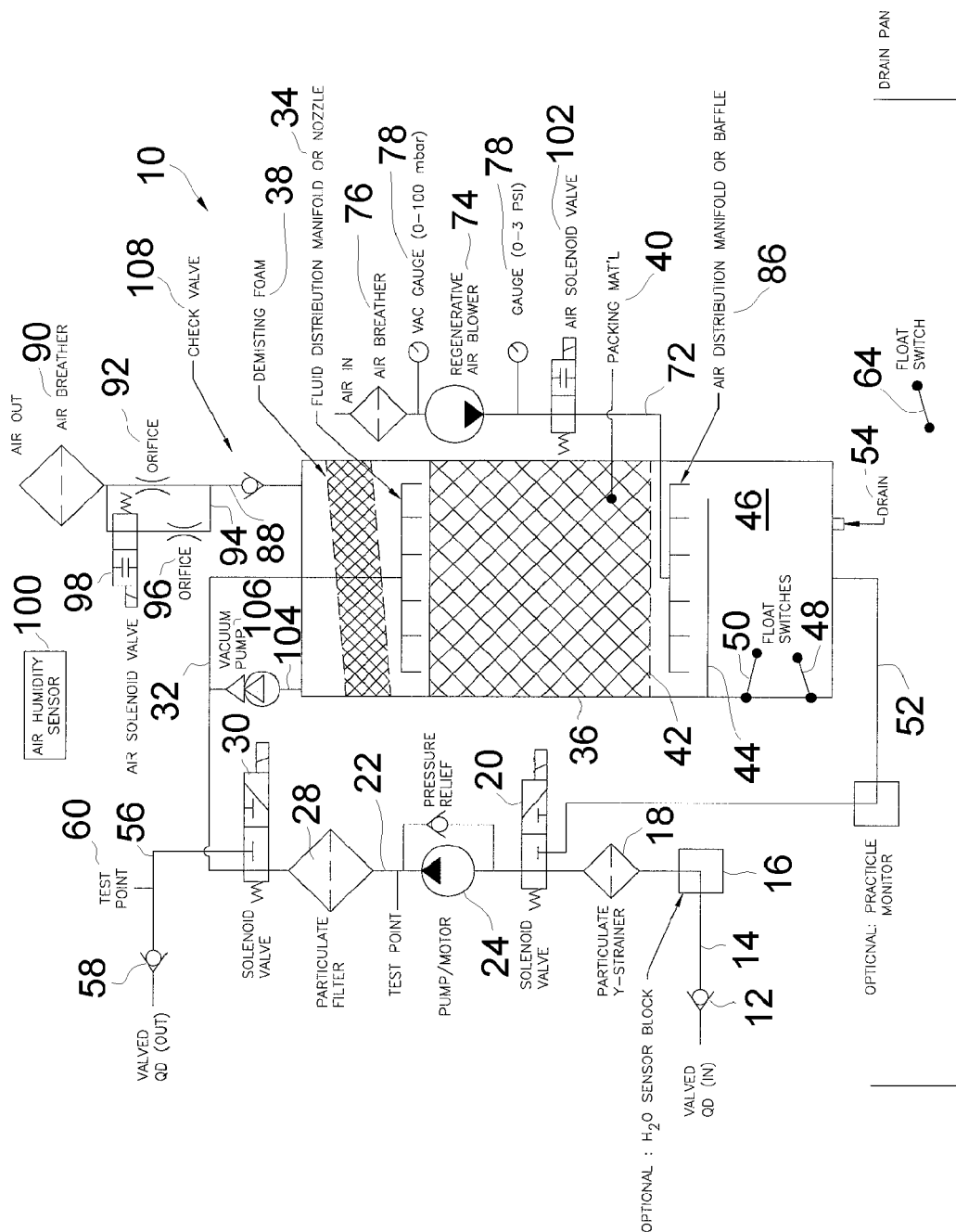
FIG. 3 is a schematic operational diagram of a industrial fluid dewatering system in accordance with another aspect of the present invention.

FIG. 3 is a schematic operational diagram of an industrial fluid dewatering system 10, similar to FIG. 2, but in accordance with another aspect of the present invention. The system 10 of FIG. 3 is substantially identical to that of FIG. 2 described above, except for construction of cyclically operating de-aerating components. The de-aerating components include a closing valve 102 in line 72, a check valve 108 in line 88 and a new line 104 extending to a vacuum pump 106.

In some situations it is beneficial to remove free and un-dissolved gasses from the industrial fluid before returning the industrial fluid to the originating source. Excess gas in the industrial fluid can cause improper function and fluid degradation in hydraulic systems. The systems 10 of FIGS. 1-2 have the ability to induce drying gas into the industrial fluid (e.g. air) and thereby return the fluid to the originating system in an increased aerated condition to some extent. The resulting aeration of the industrial fluid is acceptable, generally, when conditioning fluids from static non-operating systems. It is also acceptable when treating certain industrial fluids having a low affinity to entrain air (or other drying gas).

The system 10 of FIG. 3 is designed to include a de-aeration cycle that can be cyclically operated (taking turn with pumping fluid into the system 10 and out of the system 10. In the de-aeration cycle the solenoid valve 102 is closed, to seal the chamber 36 and the vacuum pump 106 is operated to reduce the pressure in the chamber 36 and serve to de-aerate the fluid within the chamber 36 (which may be followed by a dwell or setting time before the de-aeration cycle is complete). It is an important distinction that the vacuum pump 106 is NOT drawing in drying gas as would be done in a vacuum dehydrator system. The vacuum pump 106 is used solely for de-aeration, so there is no flow of drying gas into the chamber 36 or out of the outlet 88 during this de-aeration cycle. The system 10 of FIG. 3 allows the system 10 to further incorporate de-aeration of the industrial fluid, as desired. The length of each cycle portion for the system 10 (i.e. pumping industrial fluid into the chamber 36, de-aerating the fluid in the chamber 36, pumping dewatered and de-aerated industrial fluid out of the chamber 36) can be selected as desired.

Figure 4:
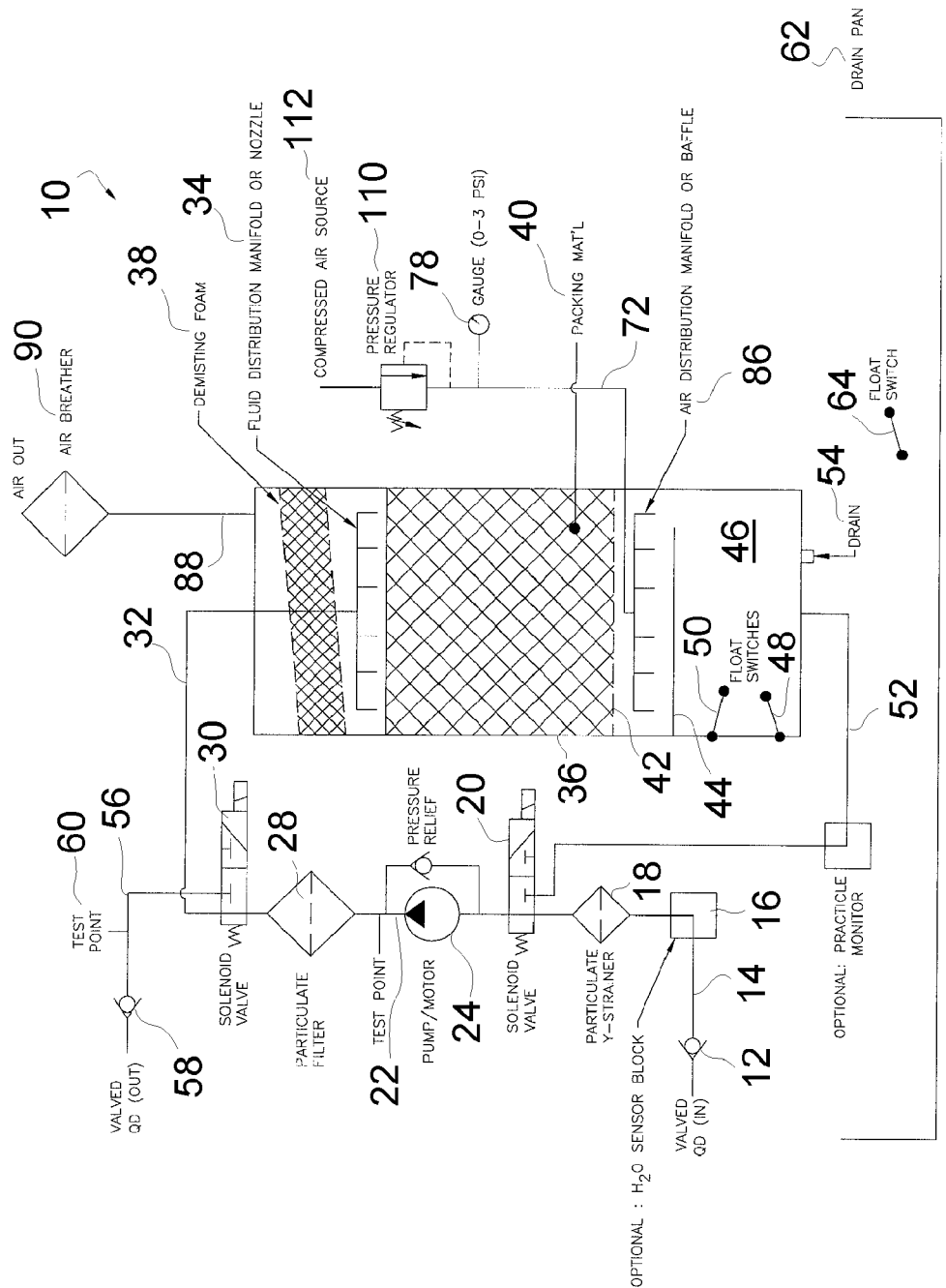
FIG. 4 is a schematic operational diagram of a industrial fluid dewatering system in accordance with another aspect of the present invention.

The use of ambient air as the source of drying gas makes the implementation of the system 10 simple and easy. However, in certain applications a source of dry air, or other drying gas mixture, may be available and may provide superior water stripping properties than ambient air and thus may be used by attaching such a source to the input line 72 without other changes to the system, provided the drying gas may be vented to atmosphere. In such applications, if the source of drying gas is readily available and is supplied under pressure, then the blower may become an expendable item for the system 10. For example, compressed air, where available in plentiful supply, provides an excellent positive pressure source of conditioned (i.e. very low humidity) air. The use of compressed air does eliminate the need for the blower. Further, industrial compressed air sources often utilize a drying system to provide a very low humidity conditioned gas, such that no heater is needed. FIG. 4 is a schematic operational diagram of an industrial fluid dewatering system 10, similar to FIG. 1, but in accordance with another aspect of the present invention. The system 10 of FIG. 4 is substantially identical to that of FIG. 1 described above, except for modification of the system 10 to operate from a source of compressed gas. The changes between the system 10 of FIG. 1 and the system 10 of FIG. 4 are in the drying gas inlet and outlet. The inlet line 72 of FIG. 4 eliminates the blower 74 and heater which may be integral thereto as well as the breather 76. The line 72 of FIG. 4 includes a pressure regulator 110 and coupling 112 for attachment to a compressed gas source. Further the outlet line 88 can eliminate the orifice 92 in light of the compressed gas source and regulator 110. The operation from a source of conditioned, low humidity gas further simplifies the construction. It is anticipated that a compete system could include both designs of FIG. 1 and FIG. 3 through a Y or parallel connection on inlet 72, whereby the system 10 could use either compressed gas source of FIG. 3 or ambient air of FIG. 1.

Figure 5:
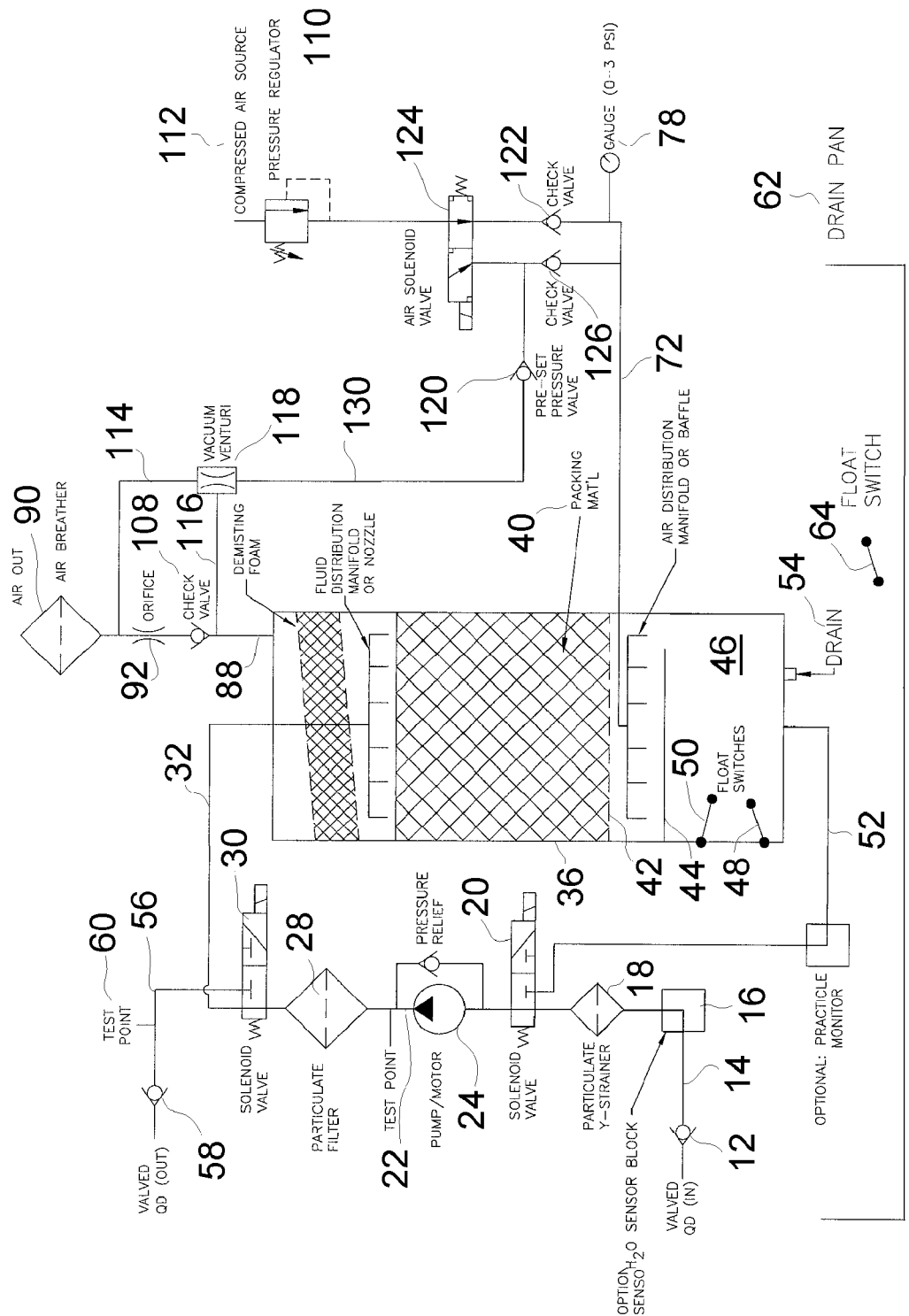
FIG. 5 is a schematic operational diagram of a industrial fluid dewatering system in accordance with another aspect of the present invention.

FIG. 5 is a schematic operational diagram of an industrial fluid dewatering system 10, similar to FIG. 4, but in accordance with another aspect of the present invention. The system 10 of FIG. 5 is substantially identical to that of FIG. 4 described above, except for construction of cyclically operating de-aerating components. The de-aerating components of FIG. 5 use a venturi vacuum principle for operation. The system 10 further includes lines 114 and 116 from outlet 88 extending to venturi vacuum element 118. A check valve 108 is in line 88 between lines 114 and 116. Pressure valve 120 in line 130, check valves 122 and 126 and solenoid 124 complete the de-aerating components of the system. In the non-de-aerating portions the compressed air will travel directly to the manifold 86 effectively as described above. When a de-aeration cycle is indicated, then solenoid valve 124 will switch to direct the air through the venturi nozzle 118. The coupling line 116 will act to cause a vacuum to form in the chamber 36 through the vacuum venturi effect. The vacuum venturi of FIG. 5 avoids the need for a separate vacuum pump for the system as in FIG. 3. The system 10 of FIG. 5 allows the system 10 to further incorporate de-aeration of the industrial fluid, as desired, as with the system of FIG. 3. The length of each cycle portion for the system 10 (i.e. pumping industrial fluid into the chamber 36, de-aerating the fluid in the chamber 36, pumping dewatered and de-aerated industrial fluid out of the chamber 36) can be selected as desired.

The compressed air system, or other compressed gas source, of FIG. 4 could use the de-aerating components of FIG. 3. Further, the ambient air blower systems of FIGS. 1 and 2 could use the de-aerating components of FIG. 5, as should be understood by the above descriptions.

The system 10 shown schematically in FIGS. 1-5 each provides a positive pressure, gravity operated dewatering system for industrial fluids, such as hydraulic fluids, lubricating fluids, and petroleum based fluids, and the system 10 can be easily constructed as a portable, hatch accessible, manually loadable, high throughput industrial fluid dewatering system 10 as shown in FIGS. 6-7. The system 10 illustrated in FIGS. 6-7 further includes a lift point 140 on the chamber 36 and can, preferably, include wheels for the system 10. The system 10 as illustrated in FIGS. 6-7 can have has a total gross weight of about 200 lbs to allow for a portable manually loadable system. The system 10 as illustrate has dimensions to accommodate hatch access. However, the system illustrated in FIGS. 1-5 is completely scalable and can be designed to accommodate any throughput. The system 10 of the present invention has sufficient throughput efficiencies that a portable hatch accessible version as shown in FIGS. 6-7 is feasible with meaningful throughput. The throughput of the present system is effective by having a large air flow, relative to comparable vacuum dehydrators.

One manner of increasing throughput is to use multiple systems 10 in parallel. Alternatively, a larger capacity chamber 36 and associated pump 24 and blower 74 could be used. As noted previously the present system is completely scalable. Where hatch accessibility, or other loading constraints, remain a concern, the chamber could be provided as one loadable component and the remaining elements as a separable unit (with their own cart, wheels and lift point). The units may then be attached through flexible coupling lines 32, 52 and 72 at the use point after the system 10 has been loaded into position.

The present invention has been described with reference to specific details of particular embodiments thereof. It is not intended that such details be regarded as limitations upon the scope of the invention except insofar as and to the extent that they are included in the accompanying claims. A number of variations to the present invention will be apparent to those of ordinary skill in the art and these variations will not depart from the spirit and scope of the present invention. The scope of the invention is defined by the appended claims and equivalents thereto.

What is claimed is:

1. A method of dewatering hydraulic, lubricating and petroleum based liquid fluids comprising the steps of:
   A) providing a gravity operated dewatering chamber configured to operate at above ambient pressure;
   B) supplying one of hydraulic, lubricating and petroleum based liquid fluid to an upper portion of the gravity operated dewatering chamber, and the chamber configured to have the liquid fluid flow through the dewatering chamber via gravity;
   C) heating a positive pressure drying gas above ambient temperature and supplying the heated positive pressure drying gas to the dewatering chamber at a position below the supply of liquid fluid in the chamber, and wherein the positive pressure drying gas is heated to a temperature that is 20-40 degrees above ambient temperature;
   D) creating an area of gas-liquid fluid interface within the chamber to accommodate transfer of water from the fluid to the heated positive pressure drying gas at above ambient pressure;
   E) venting the moisture containing drying gas from an upper portion of the chamber;
   F) collecting dewatered liquid fluid in a lower settling tank portion of the dewatering chamber.

2. The method of dewatering hydraulic, lubricating and petroleum based liquid fluids according to claim 1 further including an industrial fluid pump coupled to the gravity operated dewatering chamber wherein the pump is configured to operate alternatively to pump liquid fluid to be dewatered into the dewatering chamber, and to pump dewatered liquid fluid out of the chamber.

3. The method of dewatering hydraulic, lubricating and petroleum based liquid fluids according to claim 2 wherein during the supplying of one of hydraulic, lubricating and petroleum based liquid fluid to an upper portion of the gravity operated dewatering chamber, the method includes the step of relatively evenly distributing the fluid across the top of the chamber.

4. The method of dewatering hydraulic, lubricating and petroleum based liquid fluids according to claim 3, wherein creating an area of gas- liquid fluid interface within the chamber to accommodate transfer of water from the liquid fluid to the heated positive pressure drying gas includes forming a tortuous path for the gravity driven liquid fluid to flow down while it is being acted upon by the heated positive pressure drying gas within the chamber.

5. The method of dewatering hydraulic, lubricating and petroleum based liquid fluids according to claim 2 wherein the source of positive pressure drying gas is a compressed air source.

6. The method of dewatering hydraulic, lubricating and petroleum based liquid fluids according to claim 2 wherein the venting the moisture containing drying gas from an upper portion of the chamber includes increasing the pressure within the chamber by venting through an orifice.

7. The method of dewatering hydraulic, lubricating and petroleum based liquid fluids according to claim 2 wherein the alternating pumping of liquid fluid to be dewatered into the dewatering chamber, and pumping of dewatered liquid fluid out of the chamber is controlled through indication from low and high fluid level sensors provided in the settling tank portion of the chamber.

8. The method of dewatering hydraulic, lubricating and petroleum based liquid fluids according to claim 2 further including the provision of a demisting foam within the chamber which is configured to assist in forming condensate thereon which is returned through the chamber via gravity.

9. A method of dewatering hydraulic liquid fluid from an existing hydraulic system comprising the steps of:
   A) providing a gravity operated dewatering chamber configured to operate at above ambient pressure;
   B) supplying hydraulic liquid fluid from the hydraulic system to an upper portion of the gravity operated dewatering chamber, and the chamber configured to have the liquid fluid flow through the dewatering chamber via gravity;
   C) heating a positive pressure drying gas above ambient temperature and supplying the heated positive pressure drying gas to the dewatering chamber at a position below the supply of hydraulic liquid fluid in the chamber and wherein the positive pressure drying gas is heated to a temperature that is 20-40 degrees above ambient temperature;
   D) creating an area of gas- liquid fluid interface within the chamber to accommodate transfer of water from the hydraulic fluid to the heated positive pressure drying gas at above ambient pressure;
   E) venting the moisture containing heated positive pressure drying gas from an upper portion of the chamber;
   F) collecting dewatered hydraulic liquid fluid in a lower settling tank portion of the dewatering chamber; and
   G) returning the dewatered hydraulic liquid fluid to the hydraulic system.

10. The method of dewatering hydraulic liquid fluid according to claim 9 further including an industrial fluid pump coupled to a gravity operated dewatering chamber wherein the pump is configured to operate alternatively to pump hydraulic liquid fluid to be dewatered from the existing hydraulic system into the dewatering chamber, and to pump dewatered hydraulic liquid fluid out of the chamber back to the hydraulic system.

11. The method of dewatering hydraulic liquid fluid according to claim 10 wherein during the supplying of hydraulic liquid fluid to an upper portion of the gravity operated dewatering chamber, the method includes relatively evenly distributing the hydraulic liquid fluid across the top of the chamber.

12. The method of dewatering hydraulic liquid fluid according to claim 10 wherein creating an area of gas- liquid fluid interface within the chamber to accommodate transfer of water from the hydraulic liquid fluid to the heated positive pressure drying gas includes forming a tortuous path for the gravity driven fluid to flow down while it is being acted upon by the heated positive pressure drying gas within the chamber.

13. The method of dewatering hydraulic liquid fluid according to claim 10 wherein the alternating pumping of liquid fluid to be dewatered into the dewatering chamber, and pumping of dewatered liquid fluid out of the chamber is controlled through indication from low and high fluid level sensors provided in the settling tank portion of the chamber.

14. A method of dewatering industrial liquid fluid from an existing industrial fluid system loop comprising the steps of:
   A) providing a gravity operated dewatering chamber configured to operate at above ambient pressure and an industrial fluid pump coupled to the gravity operated dewatering chamber, wherein the pump is configured to operate alternatively to pump industrial liquid fluid to be dewatered from the existing industrial fluid system loop into the dewatering chamber, and to pump dewatered industrial liquid fluid out of the chamber back to the industrial fluid system loop;
   B) supplying industrial liquid fluid from the industrial fluid system loop via the pump to an upper portion of the gravity operated dewatering chamber, and the chamber configured to have the industrial liquid fluid flow through the dewatering chamber via gravity;
   C) heating a positive pressure drying gas above ambient temperature and supplying the heated positive pressure drying gas to the dewatering chamber at a position below the supply of industrial liquid fluid in the chamber and wherein the positive pressure drying gas is heated to a temperature that is 20-40 degrees above ambient temperature;
   D) creating an area of gas- liquid fluid interface within the chamber to accommodate transfer of water from the industrial liquid fluid to the heated positive pressure drying gas at above ambient pressure;
   E) venting the moisture containing heated positive pressure drying gas from an upper portion of the chamber;
   F) collecting dewatered industrial liquid fluid in a lower settling tank portion of the dewatering chamber; and
   G) returning the dewatered industrial liquid fluid to the industrial fluid system loop.

15. The method of dewatering industrial liquid fluid according to claim 14 wherein during the supplying of industrial liquid fluid to an upper portion of the gravity operated dewatering chamber, the method includes relatively evenly distributing the industrial liquid fluid across the top of the chamber.

16. The method of dewatering industrial liquid fluid according to claim 14 wherein creating an area of gas- liquid fluid interface within the chamber to accommodate transfer of water from the industrial liquid fluid to the heated positive pressure drying gas includes forming a tortuous path for the gravity driven fluid to flow down while it is being acted upon by heated positive pressure drying gas within the chamber.

17. The method of dewatering industrial liquid fluid according to claim 14 wherein the alternating pumping of liquid fluid to be dewatered into the dewatering chamber, and pumping of dewatered liquid fluid out of the chamber is controlled through indication from low and high fluid level sensors provided in the settling tank portion of the chamber.

* * * * *